US011540027B2

(12) United States Patent
Guzik

(10) Patent No.: US 11,540,027 B2
(45) Date of Patent: Dec. 27, 2022

(54) PERFORMANT AD HOC DATA INGESTION

(71) Applicants: Getac Technology Corporation, Taipei (TW); WHP Workflow Solutions, Inc., North Charleston, SC (US)

(72) Inventor: Thomas Guzik, Edina, MN (US)

(73) Assignees: Getac Technology Corporation, Taipei (TW); WHP Workflow Solutions, Inc., North Charleston, SC (US)

( * ) Notice: Subject to any disclaimer, the term of this patent is extended or adjusted under 35 U.S.C. 154(b) by 0 days.

(21) Appl. No.: 17/107,877

(22) Filed: Nov. 30, 2020

(65) Prior Publication Data
US 2022/0174372 A1   Jun. 2, 2022

(51) Int. Cl.
 H04N 21/647   (2011.01)
 H04W 74/00   (2009.01)

(52) U.S. Cl.
 CPC .. *H04N 21/64707* (2013.01); *H04N 21/64738* (2013.01); *H04N 21/64784* (2013.01); *H04W 74/002* (2013.01)

(58) Field of Classification Search
 CPC ....... H04N 21/64707; H04N 21/64738; H04N 21/64784
 See application file for complete search history.

(56) References Cited

U.S. PATENT DOCUMENTS

| | | |
|---|---|---|
| 6,760,744 B1 | 7/2004 | Halaas et al. |
| 7,917,888 B2 | 3/2011 | Chong et al. |
| 8,452,722 B2 | 5/2013 | Naeve et al. |
| 8,606,844 B2 | 12/2013 | Kaurman et al. |
| 8,688,320 B2 | 4/2014 | Faenger |
| 9,110,774 B1 | 8/2015 | Bonn et al. |
| 9,264,678 B2 | 2/2016 | Nuyttens et al. |

(Continued)

FOREIGN PATENT DOCUMENTS

| | | |
|---|---|---|
| CN | 109671266 B | 11/2020 |
| JP | 2008204219 A | 9/2008 |

(Continued)

OTHER PUBLICATIONS

U.S. Appl. No. 17/107,891, Office Action dated Apr. 1, 2021, 22 pages.

(Continued)

*Primary Examiner* — Joshua D Taylor
(74) *Attorney, Agent, or Firm* — Han Santos, PLLC

(57) ABSTRACT

A video processing engine may receive a request for a video communication session, via a network to produce a video file key that is routed to the video camera. If the video camera is communicatively connected to a Wi-Fi 6 compatible wireless access point, it routes a high-quality video file to the Network Operation Center (NOC). Alternatively, using the video key file, the video camera generates message digests and watermarks that are embedded in a video camera generated high-quality video file and a degraded quality video file. The video camera routes, via the network, the degraded quality video file to the NOC, while the high-quality video file is uploaded to the NOC later. Subsequently, a video processing engine extracts the watermarks from the message digests of the video files and compares them to ensure that the high-quality video file correlates to the degraded quality video file.

20 Claims, 5 Drawing Sheets

(56) References Cited

U.S. PATENT DOCUMENTS

| | | |
|---|---|---|
| 9,449,229 B1 | 9/2016 | Laska et al. |
| 9,483,732 B1 | 11/2016 | Milakovich |
| 9,485,474 B2 | 11/2016 | Kim et al. |
| 9,681,104 B2 | 6/2017 | Billau et al. |
| 9,723,251 B2 | 8/2017 | Slotky |
| 9,738,125 B1 | 8/2017 | Brickley et al. |
| 9,755,890 B2 | 9/2017 | Robertson et al. |
| 9,832,205 B2 | 11/2017 | Santhi et al. |
| 9,848,312 B2 | 12/2017 | Sundel et al. |
| 9,852,132 B2 | 12/2017 | Chhichhia et al. |
| 9,886,261 B1 | 2/2018 | Hotchkies |
| 10,324,773 B2 | 6/2019 | Wing et al. |
| 10,460,014 B2 | 10/2019 | Lloyd et al. |
| 10,540,883 B1 | 1/2020 | Keil et al. |
| 10,902,955 B1 | 1/2021 | Federoff et al. |
| 11,238,290 B2 | 2/2022 | Burns et al. |
| 2003/0081127 A1 | 5/2003 | Kirmuss |
| 2003/0095688 A1 | 5/2003 | Kirmuss |
| 2003/0163512 A1 | 8/2003 | Mikamo |
| 2003/0208679 A1* | 11/2003 | Lopez Vazquez ............ H04N 1/32277 713/176 |
| 2006/0257001 A1* | 11/2006 | Van Der Veen ............ G11B 20/00905 382/100 |
| 2008/0147267 A1 | 6/2008 | Plante et al. |
| 2008/0303903 A1 | 12/2008 | Bentley et al. |
| 2009/0150017 A1 | 6/2009 | Caminiti et al. |
| 2009/0210455 A1 | 8/2009 | Sarkar et al. |
| 2009/0248711 A1 | 10/2009 | Martinez et al. |
| 2009/0284359 A1 | 11/2009 | Huang et al. |
| 2010/0036560 A1 | 2/2010 | Wright et al. |
| 2010/0144318 A1 | 6/2010 | Cable |
| 2011/0205068 A1 | 8/2011 | Huynh et al. |
| 2011/0302151 A1 | 12/2011 | Abadi et al. |
| 2012/0084747 A1 | 4/2012 | Chakradhar et al. |
| 2013/0039542 A1 | 2/2013 | Guzik |
| 2013/0344856 A1 | 12/2013 | Silver et al. |
| 2013/0347005 A1 | 12/2013 | Lam et al. |
| 2014/0343796 A1 | 11/2014 | Abuelsaad et al. |
| 2015/0089019 A1* | 3/2015 | Chou ............... H04L 67/1095 709/217 |
| 2015/0341370 A1 | 11/2015 | Khan |
| 2016/0042767 A1 | 2/2016 | Araya et al. |
| 2016/0086397 A1 | 3/2016 | Phillips |
| 2016/0153801 A1 | 6/2016 | Cho et al. |
| 2016/0190859 A1 | 6/2016 | Blum et al. |
| 2016/0248856 A1 | 8/2016 | Kao |
| 2016/0371553 A1 | 12/2016 | Farnham, IV et al. |
| 2016/0378607 A1 | 12/2016 | Kumar et al. |
| 2017/0011324 A1 | 1/2017 | Truong et al. |
| 2017/0048482 A1 | 2/2017 | Drake et al. |
| 2017/0148027 A1 | 5/2017 | Yu et al. |
| 2017/0161323 A1 | 6/2017 | Simitsis et al. |
| 2017/0161409 A1 | 6/2017 | Martin |
| 2017/0164062 A1 | 6/2017 | Abramov et al. |
| 2018/0079413 A1 | 3/2018 | Herrero et al. |
| 2018/0145923 A1 | 5/2018 | Chen et al. |
| 2018/0285759 A1 | 10/2018 | Wood et al. |
| 2018/0365909 A1 | 12/2018 | Cheng et al. |
| 2019/0019122 A1 | 1/2019 | Allen |
| 2019/0026665 A1 | 1/2019 | Caskey et al. |
| 2019/0043351 A1 | 2/2019 | Yang et al. |
| 2019/0054925 A1 | 2/2019 | Froeschl et al. |
| 2019/0140886 A1 | 5/2019 | Zywicki et al. |
| 2019/0325354 A1 | 10/2019 | Rajnayak et al. |
| 2020/0007827 A1 | 1/2020 | Saad et al. |
| 2020/0072637 A1 | 3/2020 | Guidotti et al. |
| 2020/0074156 A1 | 3/2020 | Janumpally et al. |
| 2020/0081899 A1 | 3/2020 | Shapur et al. |
| 2020/0145620 A1 | 5/2020 | Mcantara et al. |
| 2020/0151360 A1 | 5/2020 | Zavesky et al. |
| 2020/0172112 A1 | 6/2020 | Kawashima |
| 2020/0211216 A1 | 7/2020 | Hagio et al. |
| 2020/0304854 A1* | 9/2020 | Baumgartner ........ H04L 65/607 |
| 2020/0312046 A1 | 10/2020 | Righi et al. |
| 2020/0351381 A1 | 11/2020 | Lacey et al. |
| 2021/0076002 A1 | 3/2021 | Peters et al. |
| 2021/0089374 A1 | 3/2021 | Watson et al. |
| 2021/0133808 A1 | 5/2021 | Chan et al. |
| 2021/0272702 A1 | 9/2021 | Hakami |
| 2021/0297929 A1 | 9/2021 | Frusina et al. |
| 2021/0377205 A1 | 12/2021 | Brown et al. |
| 2022/0014907 A1 | 1/2022 | Boyd et al. |
| 2022/0169258 A1 | 6/2022 | Samarthyam et al. |

FOREIGN PATENT DOCUMENTS

| | | |
|---|---|---|
| KR | 20130010400 A | 1/2013 |
| KR | 20190086134 A | 7/2019 |
| WO | 2010056891 A1 | 5/2010 |

OTHER PUBLICATIONS

U.S. Appl. No. 17/107,891, Final Office Action dated Aug. 5, 2021, 21 pages.

International Patent Application No. PCT/US2021/060890, International Search Report and Written Opinion dated Mar. 21, 2022, 11 pages.

International Patent Application No. PCT/US2021/060892, International Search Report and Written Opinion dated Mar. 21, 2022, 10 pages.

International Patent Application No. PCT/US2021/060893, International Search Report and Written Opinion dated Mar. 21, 2022, 9 pages.

International Patent Application No. PCT/US2021/060894, International Search Report and Written Opinion dated Mar. 21, 2022, 9 pages.

International Patent Application No. PCT/US2021/060895, International Search Report and Written Opinion dated Mar. 21, 9 pages.

International Patent Application No. PCT/US2021/060896, International Search Report and Written Opinion dated Mar. 14, 2022, 11 pages.

Juan Rendon et al. Structural combination of neural network models. 2016 IEEE 16th International Conference on Data Mining Workshops (ICDMW). IEEE. Dec. 12, 2016, pp. 406-413. Section II; and figure 2.

Massimo Bonavita et al. Machine Learning for Model Error Inference and Correction. Journal of Advances in Modeling Earth Systems. Nov. 13, 2020, pp. 1-22. Section 2.1; and figure 1.

Md Manjurul Ahsan et al. Deep MLP-CNN Model Using Mixed-Data to Distinguish between COVID-19 and Non-COVID-19 Patients. Symmetry 2020. Sep. 16, 2020, pp. 1-14. Section 2; and figure 3.

U.S. Appl. No. 17/107,764, Office Action dated Dec. 8, 2021, 38 pages.

U.S. Appl. No. 17/107,824, Office Action dated Dec. 29, 2021, 30 pages.

U.S. Appl. No. 17/107,891, Notice of Allowance dated Nov. 2, 2021, 23 pages.

Van Hiep Phung et al. A High-Accuracy Model Average Ensemble of Convolutional Neural Networks for Classification of Cloud Image Patches on Small Datasets. Applied Sciences 2019. Oct. 23, 2019, pp. 1-16. Section 2; and figure 3.

Xueheng Qiu et al. Ensemble Deep Learning for Regression and Time Series Forecasting. 2014 IEEE Symposium on Computational Intelligence in Ensemble Learning (CIEL). IEEE, Dec. 9, 2014, pp. 1-6.

U.S. Appl. No. 17/107,708, Office Action dated May 9, 2022, 57 pages.

U.S. Appl. No. 17/107,785, Final Office Action dated May 11, 2022, 9 pages.

U.S. Appl. No. 17/107,785, Office Action dated Mar. 29, 2022, 30 pages.

U.S. Appl. No. 17/107,824, Notice of Allowance dated May 2, 2022, 34 pages.

U.S. Appl. No. 17/107,764, Notice of Allowance dated May 26, 2022, 26 pages.

(56) References Cited

OTHER PUBLICATIONS

U.S. Appl. No. 17/107,785, Office Action dated Jul. 7, 2022, 21 pages.
U.S. Appl. No. 17/107,824, Notice of Allowance dated Jun. 7, 2022, 33 pages.
U.S. Appl. No. 17/107,830, Office Action dated Jun. 7, 2022, 51 pages.
U.S. Appl. No. 17/107,708, Final Office Action dated Aug. 19, 2022, 52 pages.
U.S. Appl. No. 17/107,714. Office Action dated Aug. 18, 2022, 66 pages.
U.S. Appl. No. 17/590,738, Notice of Allowance dated Oct. 5, 2022, 48 pages.

* cited by examiner

PERFORMANT AD HOC DATA INGESTION

BACKGROUND

Video cameras and body video cameras are tools that police officers and security service personnel use on a daily basis to document and record their activity and the behavior and actions of individuals involved in situations. The video data files are being relied on to provide an accurate and unbiased account of what transpires in the field during situations that police officers and security service personnel are being called out to.

It is equally important that the video data files from the field, be streamed back to a central office or network operation center (NOC), for supervisors and governmental officials to view the situation in real time. This allows for police supervisory personnel located in the central office or NOC to provide the police officers in the field with meaningful feedback or may give the opportunity to the police supervisory personnel to assess the gravity of the situation in real time.

Streaming of video data files requires a significant amount of wireless frequency bandwidth, and the quality of the video is dependent on the available bandwidth and on the method the bandwidth is used to break-up, package and route the data. Of equal concern are the situations where multiple police officers and/or security service personnel are involved and multiple video camera streams use the same wireless frequency bandwidth to send their video data files to the central office or NOC. In these cases, the video data stream may need to be degraded to fit the existing bandwidth and method of transmission. In these cases, the data stream may need to be downgraded to the point that supervisory personnel may not be able to determine an accurate status or assess the gravity of the situation that the police officers are involved in.

In such circumstances, the video cameras and body video cameras that record the situation, in real time, are tools that do not provide meaningful or accurate feedback and the data provided cannot be relied on. In extreme cases, due to the bandwidth and the way data is processed and routed, multiple video cameras cannot be supported, so the entire field deployed video camera system becomes unreliable and incapable of operating in the environment it was designed to work in.

BRIEF DESCRIPTION OF THE DRAWINGS

The detailed description is depicted with reference to the accompanying figures, in which the left most digit(s) of a reference number identifies the figure in which the reference number first appears. The use of the same reference numbers in different figures indicates similar or identical items.

DETAILED DESCRIPTION

Figure 1:
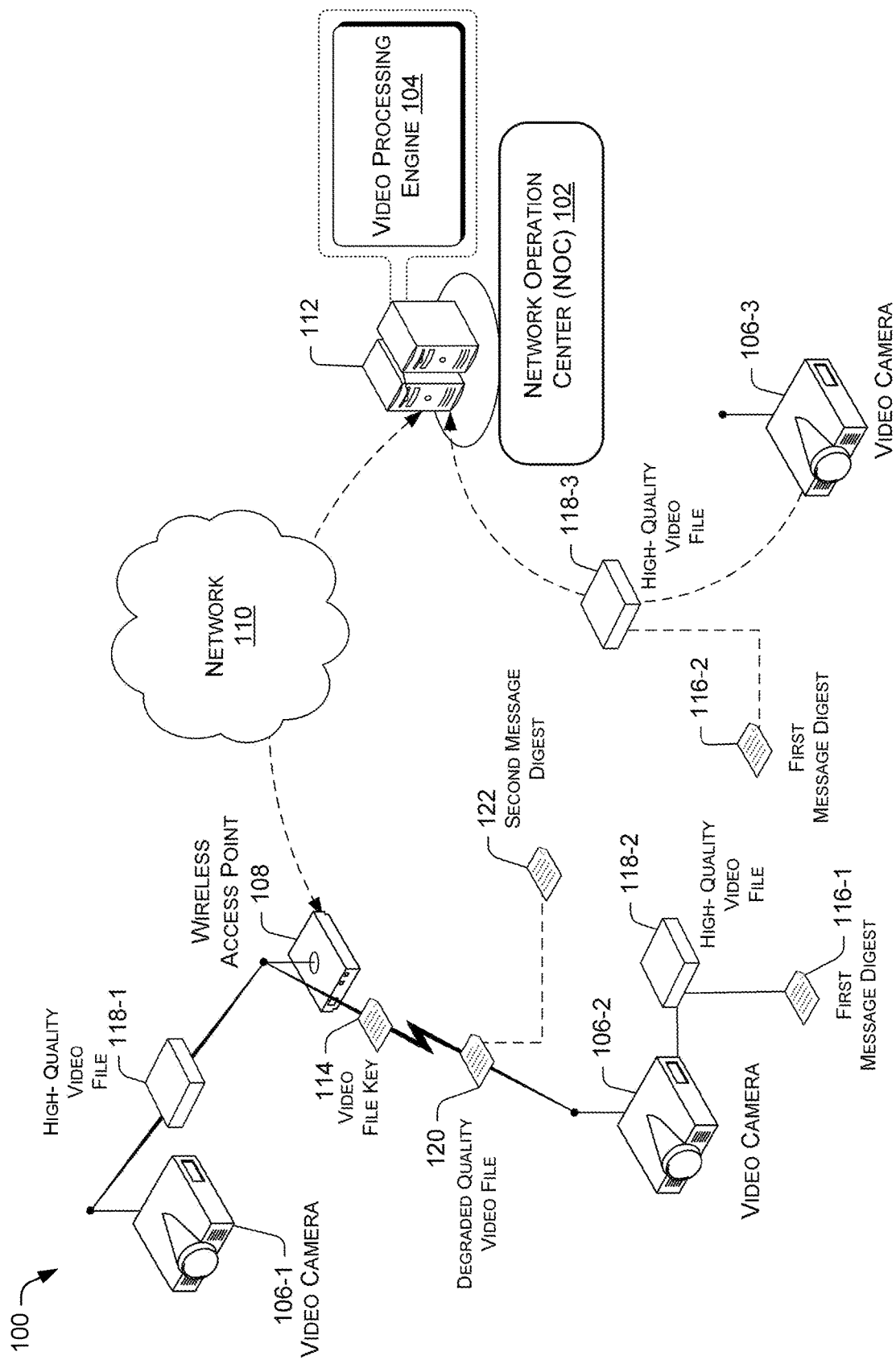
FIG. 1 illustrates an example architecture for implementing the performant ad hoc data ingestion method.

This disclosure is directed to techniques for a system that provides techniques to enlist wireless devices that are 802.11ax (Wi-Fi 6) compatible on an ad hoc basis to route video data files from a police officer or security service personnel-based video cameras to a central office or NOC. Additionally, in cases where 802.11x compatible wireless devices are not available and the video data routed to the NOC needs to be degraded for transmission, the disclosure provides techniques for demonstrating the correspondence of the degraded quality video data file to the uploaded high-quality video files to the NOC, upon return of the video camera to the NOC.

Once a request for a video session is received by the NOC, from a police officer video camera, in example embodiments described herein, the NOC in the disclosed system generates a key for the matter and distributes the key to the associated video camera. The key file holds information for the generation of a digital watermark and data that pertain to the ownership and custody of the video data produced by the video camera of the police officer and may be used to encrypt and decrypt a message digest that is associated with the video stream. The key may contain the police officer identity, a name or identifier of the video camera, and a date and time stamp.

The police officer video camera may be a body cam or any other video camera associated with the police officer that is equipped data storage devices and with network communication components to receive and transmit data, data processing components to process data, and user interface components to receive data from and present data to a user.

The video camera may search for wireless communication devices that are 802.11ax compatible and may enlist these devices to route the high-quality video data to the central office or NOC. If 802.ax compatible devices are not available, the video camera may enlist other wireless routers and devices to transmit the video data to the NOC. In these cases, once the video camera commences the recording, the video data stream will be routed to the NOC in a lower, degraded quality, and the high-quality video data will be stored onto the memory of the video camera device.

The video camera will generate a message digest for the degraded quality video file and use the key to generate and embed the digital watermark into the high-quality video data file stored onto the video camera device and the degraded quality video file transmitted to the NOC. The digital watermark embedded in the message digest is an identification code that is embedded in the message digest of the video file that can protect the integrity of the video data file by enabling detection of changes or alterations made to any part of the file. In effect, the key and message digest link the degraded quality video data file to the high-quality video data file and record or make detectable any alteration made to either file. In effect, the key and message digest preserve the integrity of the video data files and the link between the degraded quality video data file and the high-quality video data file.

Illustrative System Architecture

FIG. 1 is a schematic diagram of an illustrative computing environment 100 for a method of transferring a high-quality video data file to a network operation center (NOC), or routing a degraded quality video data file to the NOC, while the video camera is in the field, and/or later uploading the high-quality video data file to the NOC while maintaining a link between the high-quality video file to the degraded quality video data file. The computing environment shows a NOC 102, with a video processing engine 104, that provides a method for maintaining a link between a degraded quality video data file and its corresponding high-quality video data file. Additionally, the environment shows a video camera 106 in different conditions at different times. The NOC 102 is communicatively connected with a video camera 106-1 and video camera 106-2, via a Wi-Fi access point 108. The video data is transmitted to the NOC 102 by means of the wireless communication signal and the Network 110. Alternatively, in a third condition the video camera 106-3, may upload video data via a physical, wired connection to the NOC 102.

The servers 112, of the NOC 102, may interact with a field deployed video camera in different ways or via different mechanisms, as shown for example with respect to video camera 106-1 and video camera 106-2. The video camera may include a body camera that is secured to a police officer or a security service officer and is directed to capture a situation that the police officer has been called to, for assistance. The video camera may be equipped with data storage devices and with network communication components to receive and transmit data, data processing components, and user interface components to receive data from and present data to a user. Additionally, the video camera may be equipped with additional cable interfaces for the transfer of data to other devices and the NOC. Sample cable interfaces may include, but not be limited to, High Definition Multimedia Interface (HDMI), Radio Corporation of America (RCA), Bayonet-Neill-Concelman (BNC), Video Graphics Array (VGA), coaxial cable, and others. The video data feed may be stored in a data file, formatted as Advanced Video Coding High Definition (AVCHD), Moving Picture Experts Group (MPEG), Movie Digital Video (MOV), Windows Media Video (WMV), Audio Video Interleave (AVI) or any other video formatting file, prior to routing it to the NOC. In some embodiments, the video data files may be routed to another device, such as a server, via a physical cable connected to the video camera, for example as shown in FIG. 1 with respect to video camera 106-3. In other embodiments, rather than being physically connected, the video camera may be communicatively connected to wireless access point 108 and the wired cable may be replaced with a wireless signal, such as wireless signals of Wi-Fi frequencies, frequencies in the infrared spectrum, or any other frequency used to communicate between devices. In turn, the wireless access point may be communicatively connected to the NOC, via a network 110. The network 110 may include one or more of a local area network ("LAN"), a larger network such as a wide area network ("WAN"), a mobile telephone network, and/or a collection of networks, or the Internet. The network 110 may be a wired network, a wireless network, or both.

The police officer involved in a situation may initiate a video communication session with the NOC 102 to route video data from the video camera 106-1 to the NOC 102. Subsequently, the video camera 106-1 may test the wireless connection with the wireless access point 108 to determine if the wireless access point is compatible with the IEEE 802.11ax (Wi-Fi 6) standard. The Wi-Fi 6 standard, designed to work in the license exempt bands, presents improved and efficient wireless bandwidth utilization, with improved data transfer rates and reduced latency. Wi-Fi 6 compatible wireless access points may be capable of handling higher data rates of transmission for video files, when compared to previous Wi-Fi capable systems. If the video camera 106-1 deems that the wireless access point 108, that it is communicatively connected with, is Wi-Fi 6 compatible, the video camera 106-1 may route the high-quality video file 118 to the NOC 102 and the video processing engine 104 via the wireless access point 108, for processing and storage.

In an alternative embodiment, if the wireless access point 108 is not deemed to be Wi-Fi 6 compatible, the video camera, such as video camera 106-2 may route a degraded quality video data file 120 to the NOC 102 for processing and storage, while the high-quality video file 118-2 is stored on the video camera 106-2. The degraded quality video data file 120 may be a video data file that contains a lower resolution, or lower pixel count per video frame, and/or a lower frame rate, so that the existing Wi-Fi system is capable of routing the video data without interruption. The rate of degradation of the degraded quality video file 120 may corollate to the Wi-Fi system available and the wireless spectrum available. For example, if multiple video cameras use the same wireless access point to route video data files to the NOC 102, the video data file for each video camera may need to be degraded to the point that the video data files can be routed to the NOC 102 without interruption in the transmission of either video data files.

In cases where a degraded quality video file is routed to the NOC, the NOC 102 may generate a video file key 114 and route the video file key 114 to the video camera 106-2. The video file key 114 holds values and data that pertain to the ownership and custody of the video data produced by the video camera 106-2 of the police officer. The video file key 114 may contain instructions to generate a digital watermark, the police officer identity, a name or identifier of the of the video camera, and a date and time stamp. Subsequently, after receiving the video file key 114, the video camera 106-2 may generate a first message digest 116-1, using the video file key 114, and embed the generated first message digest 116 and digital watermark into the high-quality video file 118. Furthermore, using the video file key 114, the video camera 106-2 may generate a second message digest 122 and embed the generated second message digest 122 and digital watermark into the degraded video data file 120.

The first message digest 116 and the second message digest 122, may contain a digital watermark, designed to protect the integrity of the video data files, to detect changes and alterations made to any part of the video data files. For example, the first message digest 116-1 associated with the high-quality video data file 118-2 changes if the high-quality video data file 118-2 is altered or modified. Alternatively, the second message digest 122 associated with the degraded quality video file 120 changes if the degraded quality video file 120 is altered or modified. Not only can the first message digest support determine file changes to the respective video files, but they can also be used to assist with determining duplicate video files.

In an alternate embodiment, the digital watermark generated by the video key file 114, may be encoded directly in the degraded video data file 120 and the high-quality video file 118 after the video files are generated.

In additional embodiments, the video file key 114 may expire after the message digests are embedded; however, the video file key 114 and associated digital watermark information may be stored at the NOC 102. At the request of the police officer, the video communication session with the NOC 102 may be terminated, at which point the transmission of the degraded quality video file 120 is stopped.

At the NOC 102, the police officer may use the video camera 106-3 to upload the high-quality data file 118-3 and the embedded message digest 116-2 to the servers 112, via a physical cable connection or, in additional embodiments, the high-quality data file 118-3 may be uploaded to the servers 112 via a wireless communication link with a Wi-Fi 6 compatible wireless access point.

The video processing engine 104, of the NOC 102 may compare the second message digest 122 of the previously received degraded quality video file 120 to the first message digest 116-2 of the high-quality video file 118-3 to determine if the digital watermark embedded in both message digests are undistinguishable, which is an assurance that video data presented by both videos correlates to each other.

The video processing engine 104 may receive the high-quality video file 118-3 and extract the first message digest 116-3 from the video file. Subsequently, the video processing engine 104 may regenerate the second message digest 122 of the degraded quality video file 120. Afterwards, the digital watermark of the second message digest 122 of the degraded quality video file 120 is compared to the digital watermark of the first message digest 116-2 of the high-quality video file 118-3. If the digital watermark of the second message digest 122 is identical to the digital watermark of the first message digest 116-2, then the degraded quality video file 120 is deemed to show the reflect the dame event as the high-quality video file 118-3. In this case, the degraded quality video file and the high-quality video file present the same event and there are no modifications between the two video streams. Alternatively, if the digital watermark of the second message digest 122 is not identical to the digital watermark of the first message digest 116-2, then the degraded quality video file 120 is not identical to the high-quality video file 118-3 and one of the video files was modified after it was created.

Example Server Components

Figure 2:
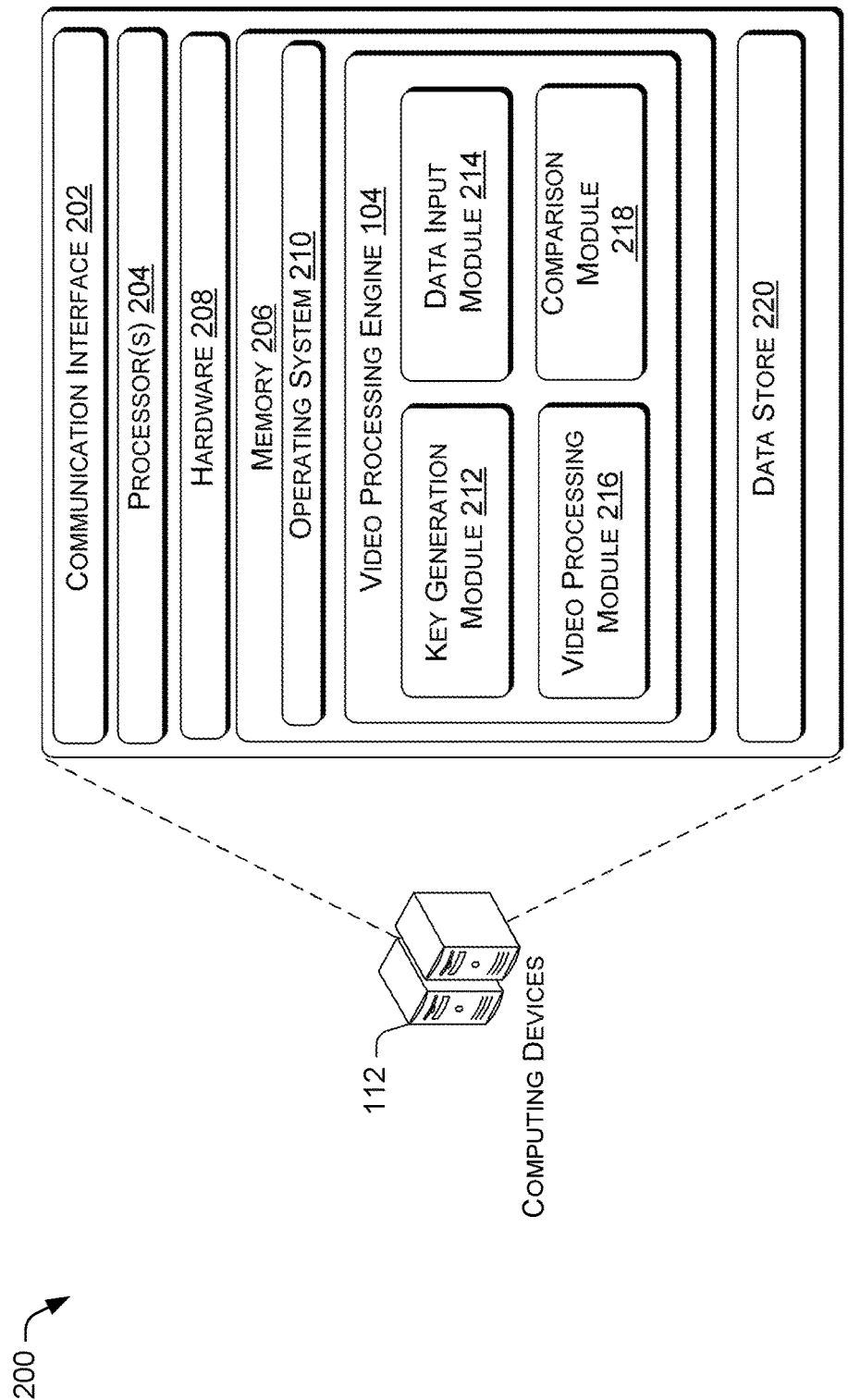
FIG. 2 is a block diagram showing various components of a computing device that implements the performant ad hoc data ingestion method.

FIG. 2 is a block diagram showing various components of the Network Operation Center (NOC) 102 that implements the video processing engine 104. The video processing engine 104 may be implemented on one or more computing devices 112 that are part of the NOC 102. The computing devices 112 may include general purpose computers, such as desktop computers, tablet computers, laptop computers, servers, or other electronic devices that are capable of receive inputs, process the inputs, and generate output data. In other embodiments, the computing devices 112 may be virtual computing devices in the form of virtual machines or software containers that are hosted in a cloud. The computing devices 112 may be equipped with a communication interface 202, one or more processors 204, memory 206, and device hardware 208. The communication interface 202 may include wireless and/or wired communication components that enable the computing devices to transmit data to and receive data from other networked devices via a communication network. The device hardware 208 may include additional hardware that performs user interface, data display, data communication, data storage, and/or other server functions.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, Random-Access Memory (RAM), Dynamic Random-Access Memory (DRAM), Read-Only Memory (ROM), Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. Computer readable storage media do not consist of, and are not formed exclusively by, modulated data signals, such as a carrier wave. In contrast, communication media may embody computer-readable instructions, data structures, program modules, or other data in a modulated data signal, such as a carrier wave, or other transmission mechanism.

The processors 204 and the memory 206 of the computing devices 112 may implement an operating system 210 and the video processing engine 104. The operating system 210 may include components that enable the computing devices 112 to receive and transmit data via various interfaces (e.g., user controls, communication interface, and/or memory input/output devices), as well as process data using the processors 204 to generate output. The operating system 210 may include a display component that presents the output (e.g., display the data on an electronic display, store the data in memory, transmit the data to another electronic device, etc.). Additionally, the operating system 210 may include other components that perform various additional functions generally associated with an operating system.

The video processing engine 104 may include a key generation module 212, data input module 214, a video processing module 216, and a video comparison module 218. The sentiment analysis engine 104 may also interact with a data store 220. These modules may include routines, program instructions, objects, and/or data structures that perform particular tasks or implement particular abstract data types.

The data input module 212 may receive video data files, such as degraded quality video file 120 and high-quality video file 118. The video data files may be received via the network 110 or a physical wired connection between the video camera 106 and the computing devices 112 of the NOC 102. The video data files may include visual and auditory data of the situation, message digests, and codecs. The codec is used to compress and decompress video files and its function is dependent on the video file format.

The key generation module 214 may generate a video file key, such as video file key 114. for a video communication session with a police officer video camera, such as video camera 106. At the request for a video communication session from a field deployed police officer video camera, the key generation module 214 may generate a video file key that is specific to the video communication session. The video file key contains information for the generation of a digital watermark which can be applied to a message digest the video file key may be used to encrypt or decrypt a message digest. The video file key may be symmetric, in that the same key can used for the encryption and decryption of the message digest, and it may be generated to comply with the Data Encryption Standard (DES), the Advanced Encryption Standard (AES), or any other standard used for generating keys for the encryption and decryption of data. In additional embodiments, the video file key may contain information that holds the identity of the police officer, a name or identifier of the video camera, and a date and time stamp. Once the video file key is generated, the NOC 102 may route the video file key to the video camera.

The video processing module 216 may process the video file data by extracting or regenerating the message digests associated with video data files. For the extraction and regeneration of message digests, the video file key that is specific for the video communication session may be used for the decryption of data that forms the message digest. For example, the video processing module 216 may extract the first message digest 116 that is embedded in the high-quality video file 118, and/or it may regenerate the second message digest 122 of the degraded quality video file 120.

The video comparison module 218, may compare the digital watermark fixed in the first message digest 116 of the high-quality video file 118 to the digital watermark fixed in the second message digest 122 of the degraded quality video file 120, designed to protect the integrity of the video files. If the digital watermark fixed in the second message digest 122 of the degraded quality video file 120 is identical to the digital watermark fixed in the first message digest 116 of the high-quality video file 118, the degraded quality video file 120 is deemed to correspond to the high-quality video file 118 and both video files present the situation that the police officer is involved in indistinguishable fashion. Alternatively, if the digital watermark fixed in the second message digest 122 of the degraded quality video file 120 is not identical to the digital watermark fixed in the message digest 116 of the high-quality video file 118, the degraded quality video file 120 and the high-quality video file 118 are dissimilar and one video file is modified with respect to the other. Furthermore, the video comparison module 216 may generate a report identifying the video communication session, the degraded quality video file 120, the high-quality video file 118 and the quality of the respective message digests. The quality is a qualifier that identifies whether the digital watermarks of the respective video data files are identical or dissimilar.

The data store 220 may store data that is used by the various modules of the video processing engine 104. The data store 220 may include one or more databases, such as relational databases, object databases, object-relational databases, and/or key-value databases. In various embodiments, the data store 220 may store video file keys, message digests, high-quality video files and degraded quality video files.

Example Video Camera Components

Figure 3:
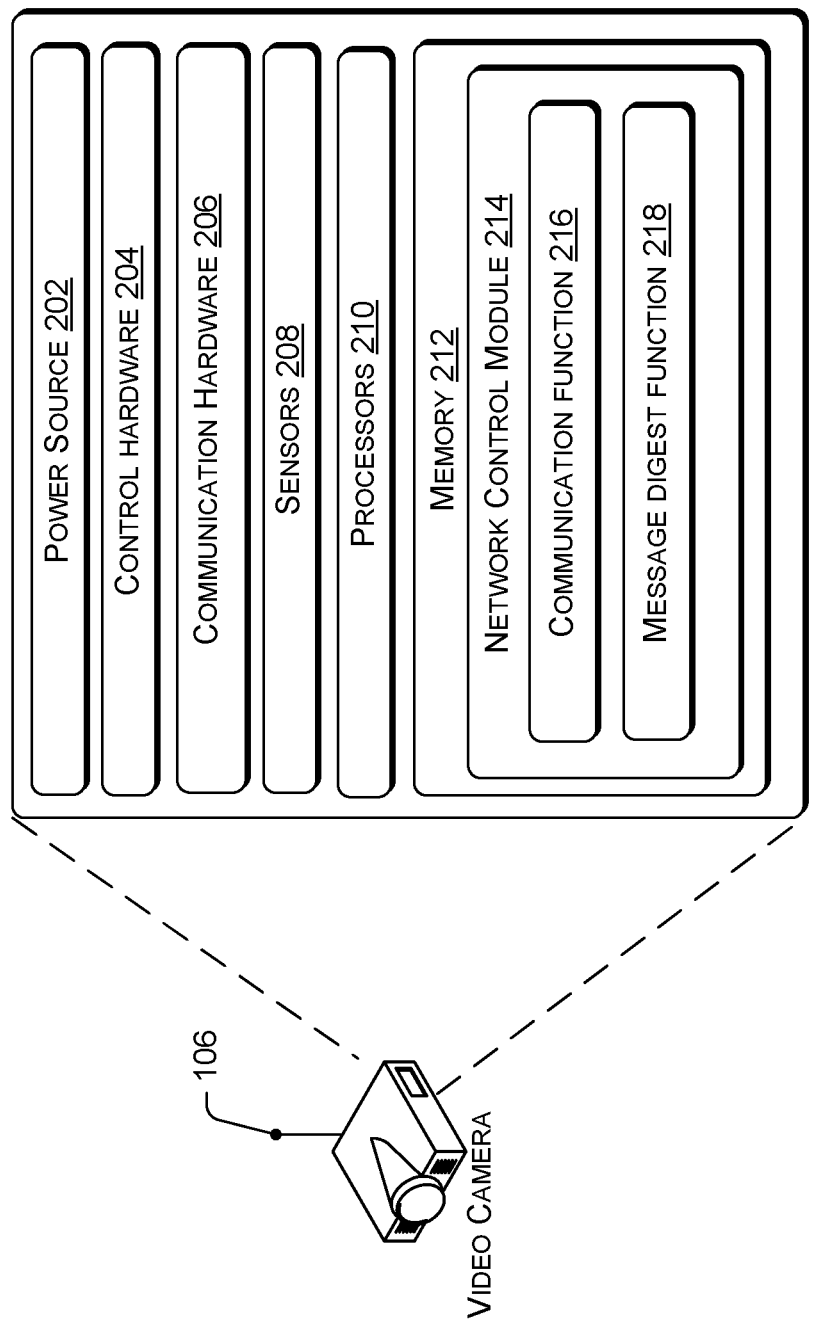
FIG. 3 is a block diagram showing various components of a video camera that implements the performant ad hoc data ingestion method.

FIG. 3 is a block diagram showing various components of a video camera, such as video camera 106, that support the performant ad hoc data ingestion. The video camera 106 may include a power source 302, hardware 304, communication hardware 306, sensors 308, one or more processors 310, and memory 312. The power source 302 may include electrical cells, and/or other energy sources. In some embodiments, the power source 302 may be embedded in the video camera and the power source 302 may be recharged via a cable connecting the video camera to a power outlet. In additional embodiments, the power source 302 may be detached from the video camera for it to be connected to a power outlet for recharging. The power outlet may include an electrical outlet or any other outlet that provides the means for the power source 202 to be recharged.

The control hardware 304 may include mechanical switches, electronic switches, toggle switches, and sliding switches that control the video camera 106. For example, the switches may include on/off switches, switches for video camera settings, switches for control of the video recording and/or transmission of video files, and/or so forth.

The communication hardware 306 may include hardware components that enable the video camera 106 to communicate with wireless access point 108. In various embodiments, the communication hardware 306 further include cellular transceivers, hardware decoders and encoders, an antenna controller, a memory buffer, a network interface controller, a universal serial bus (USB) controller, and/or other signal processing and communication components. Accordingly, the communication hardware 306 may support the transmission and reception data for wireless communication. The communication hardware 306 may further include one or more antennae that support the transmission and reception of data signals. The antennae may include a Yagi antenna, a horn antenna, a dish reflector antenna, a slot antenna, a waveguide antenna, a Vivaldi antenna, a helix antenna, a planar antenna, a dipole array antenna, an origami antenna, and/or other types of antennae. In some instances, an antenna may be oriented to point to a direction via electrical beam forming and/or via mechanical movement of one or more elements of the antenna by an antenna controller.

The sensors 308 may include visual and auditory recording sensors, a global positioning system (GPS) sensor, control setting sensors, and/or other sensors. The various sensors may provide video files and operational information regarding the video camera 106 that is transmitted by the communication hardware 306 to the NOC 102.

Each of the processors 310 may be a single-core processor, a multi-core processor, a complex instruction set computing (CISC) processor, or another type of processor. The memory 312 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital storage disks or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The one or more processors 310 and the memory 312 may implement a network control module 314, a communication function 316, and a message digest function 318. These modules may include routines, program instructions, objects, and/or data structures that perform tasks or implement abstract data types. The network control module 314 may receive a request for a communication session with the NOC 102. In response to a communication session request, the communication function 316, of the network control module 314, may test the wireless communication connection of the video camera 106 to the wireless access point 108 it is communicatively connected with, to determine wireless bandwidth utilization, data transmission rate, and data transmission latency. The objective of the wireless communication connection test is to determine if the wireless access point 108 is compatible with the Wi-Fi 6 wireless communication standard. The communication standard of the wireless communication connection between the video camera 106 and the wireless access point 108 affects the type video file that is routed to the NOC 102. If the wireless access point 108 is Wi-Fi 6 compatible, the video camera 106 will route the high-quality video file to the NOC 102. Alternatively, the video camera 106 will route the degraded video file to the NOC 102.

In an example embodiment, if the wireless access point 108 that the video camera 106 is communicatively connected to is not Wi-Fi 6 compatible, the NOC generates and routes a video file key, such as video file key 114, to the video camera 106. In accordance with example embodiments, the message digest function 318, of the network control module 314, may use the video file key to generate a message digest and insert a digital watermark in the message digest. The network control module 314 will then embed the message digest in the video file. For example, using video file key 114, the message digest function 318 may generate a digital watermark and insert it in a first message digest 118, and then embed the message digest 118 in the high-quality video file 118. Furthermore, the message digest function 318 may insert the digital watermark in a second message digest 122 and embed the second message digest 122 in the degraded quality video file 120. It will be recognized that other techniques can be used to encrypt and/or digitally mark the video files to help discern whether they are later altered or tampered with, and/or whether they accurately represent the same event and correlate with each other. For example, the digest and watermark can be separately applied to the video files, and/or the digest can be embedded into a video file and then the watermark can be applied to the resulting video file, and/or digital signatures can be employed to accomplish the objectives described above, and so forth.

Illustrative Operations

Figure 4:
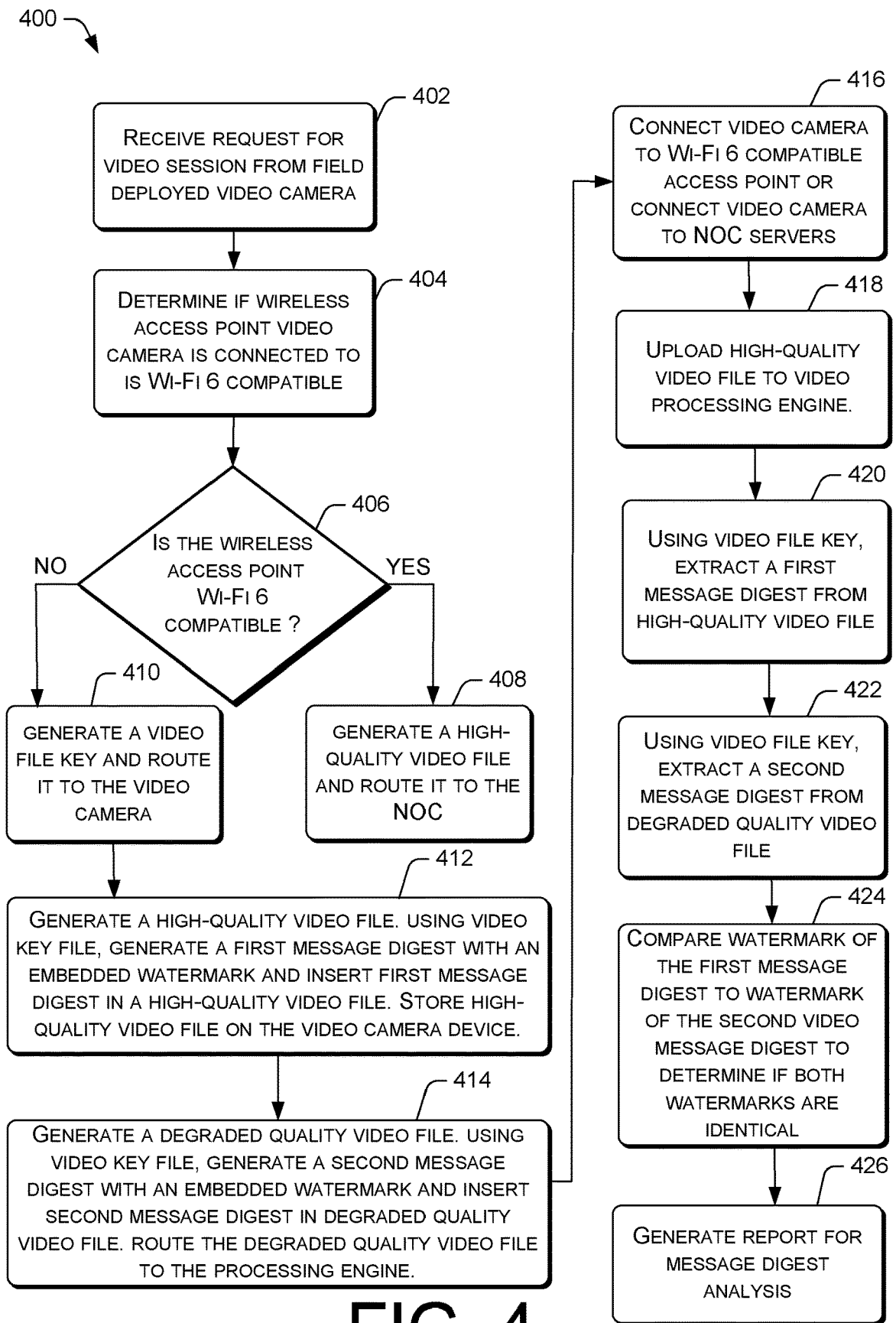
FIG. 4 is a flow diagram of an example process for the performant ad hoc data ingestion method.
Figure 5:
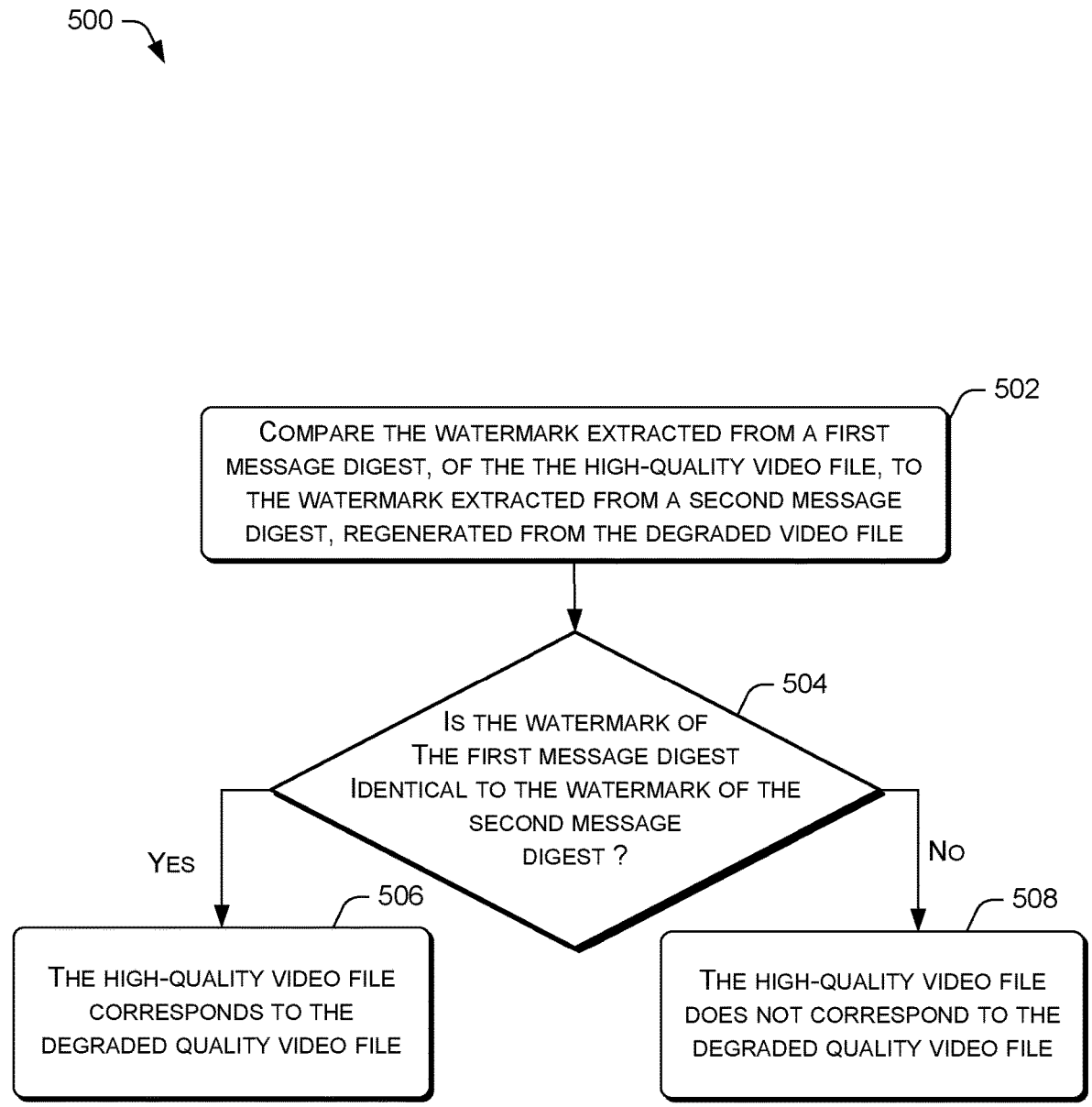
FIG. 5 is a flow diagram of an example process for the video processing engine that is implemented by the performant ad hoc data ingestion method.

FIGS. 4-5 present illustrative processes 400-500 for implementing the performant ad hoc data ingestion. Each of the processes 400-500 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like, that perform functions or implement abstract data types. The order in which the operations are described is not intended to be construed as a limitation, and any number of the described blocks can be combined in any order and/or in parallel to implement the process. For discussion purposes, the processes 400-500 are described with reference to the performant ad hoc data ingestion environment 100 of FIG. 1.

FIG. 4 is a flow diagram of an example process for implementing the performant ad hoc data ingestion. At block 402, a Network Operation Center (NOC), via a network, may receive a request for a video communication session from a video camera of a police officer involved in a situation.

At block 404, the video camera may ascertain the data throughput of the wireless access point that is communicatively connected to. The data throughput is a factor in the communication that affects the quality of the video data file transmission from the video camera to the NOC.

At decision block 406, if the video camera establishes that the wireless access point that is communicatively connected to is Wi-Fi 6 compatible ("yes" at decision block 406), the process 400 may proceed to block 408. If the video camera establishes that the wireless access point is not Wi-Fi 6 compatible ("no" at decision block 406), the process 400 may proceed to block 410.

At block 408, the video camera may generate a high-quality video file and may route the high-quality video file to the NOC via the Wi-Fi6 compatible wireless access point.

At block 410, the NOC may generate a video file key and, via a network, and may route the video file key to the video camera of the police officer involved in the situation. The video file key may contain the police officer identity, a name or identifier of the of the video camera, and a date and time stamp. The video file key may be used to encrypted or decrypted message digests that are associated with the video data files produced by the video camera.

At block 412, the video camera may generate a high-quality video file of the situation and store the high-quality video on the video camera device. Using the video file key, the video camera may generate a digital watermark and insert it in a first generated message digest. Additionally, the video camera may embed the first message digest into the high-quality video file.

At block 414, the video camera may generate a degraded quality video file of the situation and route the degraded quality video file to the NOC, via the wireless access point. Using the video file key, the video camera may insert the digital watermark in a second generated message digest. Additionally, the video camera may embed the second message digest into the degraded quality video file.

At block 416, the video camera is returned by the police officer from the situation to the NOC or to a location where the video camera may be communicatively connected to a Wi-Fi 6 enabled wireless access point.

At block 418, the server video processing engine may receive the high-quality video file via a wired or wireless connection between the video camera and the NOC. Prior to making a wireless connection with the NOC, the video camera ensures that the wireless access point that is communicatively connected to is Wi-Fi 6 compatible.

At block 420, the server video processing engine, using the key, may extract and decrypt the first message digest that is embedded in the high-quality video file.

At block 422, the server video processing engine, using the key, may decrypt and regenerate the second message digest of the degraded quality video file, previously routed to the NOC from the location of the situation.

At block 424, the server video processing engine, compares the digital watermark of the second message digest of the degraded quality video file to the digital watermark of the first message digest of the high-quality video file. If the video processing engine deems that the digital watermarks are identical, then the high-quality and degraded video files present the situation that the police officer is involved in indistinguishable fashion. If the two digital watermarks are not identical, then one video file is modified with respect to the other video file. The degraded quality and the high-quality video files do not present the identical information.

At block 426, the server video processing engine may generate a report with the results of the digital watermark comparison. The report may include the police officer identity, a name or identifier of the of the video camera, a date and time stamp, a result of the comparison of the message digests, and/or so forth.

FIG. 5 is a flow diagram of an example process 500 for determining the parity of the first message digest embedded into the high-quality video file to the second message digest generated from the degraded quality video file. At block 502 the sentiment analysis engine may compare the digital watermark of the first message digest embedded into the high-quality video file to the digital watermark of the second message digest generated from the degraded quality video file.

At decision block 504, if the video processing engine establishes that the digital watermark of the first message digest embedded into the high-quality video file is identical to the digital watermark of the second message digest generated from the degraded quality video file ("yes" at decision block 504), the process 500 may proceed to block 506. If the video processing engine establishes that the digital watermark of the first message digest embedded into the high-quality video file is not identical to the digital watermark of the second message digest generated from the degraded quality video file ("no" at decision block 504), the process 500 may proceed to block 508.

At block 506, the video processing engine labels the high-quality video file as corresponding to the degraded quality video file.

At block 508, the video processing engine labels the high-quality video file as being modified with respect to the degraded quality video file.

Conclusion

Although the subject matter has been described in language specific to the structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media, storing computer-executable instructions that upon execution cause one or more processors to perform acts comprising:

receiving a request for a communication session from a video camera deployed in a field;

generating a video file key and routing the video file key to the video camera deployed in the field;

receiving a video data stream that includes a degraded quality video file in response to a determination by the video camera of an incompatible wireless access point, wherein a corresponding high-quality video file of the degraded quality video file is stored on the video camera;

receiving, via a compatible wireless access point, an uploaded stored high-quality video file with an embedded digital watermark that identifies the high-quality video file to correspond to the degraded quality video file, wherein the high-quality video file is associated with a first message digest that identifies the high-quality video file, the first message digest and the digital watermark being generated by the video camera using the video file key, wherein the degraded quality video file is associated with a digital watermark and a second message digest that identifies the degraded quality video file;

extracting the digital watermark and the first message digest from the high-quality video file;

extracting the digital watermark and the second message digest from the degraded quality video file; and comparing the digital watermark of the high-quality video file to the digital watermark of the degraded quality video file to establish that the high-quality video file corresponds to the degraded quality video file.

2. The one or more non-transitory computer-readable media of claim 1, wherein the high-quality video file is stored to prevent an interruption of transmission of video data files to a network operating center (NOC).

3. The one or more non-transitory computer-readable media of claim 1, wherein the video file key is used to encrypt and decrypt the first and second message digests and generate the digital watermarks.

4. The one or more non-transitory computer-readable media of claim 1, wherein the high-quality video file is uploaded after a transmission of the degraded quality video file.

5. The one or more non-transitory computer-readable media of claim 1, wherein the high-quality video file and the degraded quality video file are routed via airwaves or a wired connection.

6. The one or more non-transitory computer-readable media of claim 1, wherein the degraded quality video file includes a video data file of lower resolution, lower pixel count per video frame, or a lower frame rate than the high-quality video file.

7. The one or more non-transitory computer-readable media of claim 1, wherein a rate of degradation of the degraded quality video file is correlated to an available wireless spectrum.

8. The one or more non-transitory computer-readable media of claim 1, wherein a dissimilarity between the digital watermark of the high-quality video file and the digital watermark of the degraded quality video file indicates a determination of the degraded quality video file not matching the high-quality video file.

9. A system comprising:

one or more processors; and memory having instructions stored therein, the instructions, when executed by one or more processors, cause the one or more processors to perform acts comprising:

receiving a request for a communication session from a video camera deployed in a field;

generating a video file key and routing the video file key to the video camera deployed in the field;

receiving a video data stream that includes a degraded quality video file in response to a determination by the video camera of an incompatible wireless access point, wherein a corresponding high-quality video file of the degraded quality video file is stored on the video camera;

receiving, via a compatible wireless access point, an uploaded stored high-quality video file with an embedded digital watermark that identifies the high-quality video file to correspond to the degraded quality video file, wherein the high-quality video file is associated with a first message digest that identifies the high-quality video file, the first message digest and the digital watermark being generated by the video camera using the video file key, wherein the degraded quality video file is associated with a digital watermark and a second message digest that identifies the degraded quality video file;

extracting the digital watermark and the first message digest from the high-quality video file;

extracting the digital watermark and the second message digest from the degraded quality video file; and comparing the digital watermark of the high-quality video file to the digital watermark of the degraded quality video file to establish that the high-quality video file corresponds to the degraded quality video file.

10. The system of claim 9, wherein the high-quality video file is stored to prevent an interruption of transmission of video data files to a network operating center (NOC).

11. The system of claim 9, wherein the video file key is used to encrypt and decrypt the first and second message digests and generate the digital watermarks.

12. The system of claim 9, wherein the high-quality video file is uploaded after a transmission of the degraded quality video file.

13. The system of claim 9, wherein the high-quality video file and the degraded quality video file are routed via airwaves or a wired connection.

14. The system of claim 9, wherein the degraded quality video file includes a video data file of lower resolution, lower pixel count per video frame, or a lower frame rate than the high-quality video file.

15. The system of claim 9, wherein a rate of degradation of the degraded quality video file is correlated to an available wireless spectrum.

16. The system of claim 9, wherein a dissimilarity between the digital watermark of the high-quality video file and the digital watermark of the degraded quality video file indicates a determination of the degraded quality video file not matching the high-quality video file.

17. A computer implemented method, comprising:
receiving a request for a communication session from a video camera deployed in a field;
generating a video file key and routing the video file key to the video camera deployed in the field;
receiving a video data stream that includes a degraded quality video file in response to a determination by the video camera of an incompatible wireless access point, wherein a corresponding high-quality video file of the degraded quality video file is stored on the video camera;
receiving, via a compatible wireless access point, an uploaded stored high-quality video file with an embedded digital watermark that identifies the high-quality video file to correspond to the degraded quality video file,
wherein the high-quality video file is associated with a first message digest that identifies the high-quality video file, the first message digest and the digital watermark being generated by the video camera using the video file key;
wherein the degraded quality video file is associated with a digital watermark and an associated second message digest that identifies the degraded quality video file;
extracting the digital watermark and the first message digest from the high-quality video file;
extracting the digital watermark and the second message digest from the degraded quality video file;
comparing the digital watermark of the high-quality video file to the digital watermark of the degraded quality video file; and
determining a correlation between a received high-quality video file and a received degraded quality video file based at least upon the comparing between the digital watermarks.

18. The method of claim 17, wherein the high-quality video file is stored to prevent an interruption of transmission of video data files to a network operating center (NOC).

19. The method of claim 17, wherein the video file key is used to encrypt and decrypt the first and second message digests and generate the digital watermarks.

20. The method of claim 17, wherein the high-quality video file is uploaded after a transmission of the degraded quality video file.

* * * * *